United States Patent [19]

Gottschall

[11] Patent Number: 4,749,167

[45] Date of Patent: Jun. 7, 1988

[54] TWO POSITION MECHANISM

[76] Inventor: Martin Gottschall, 109 Curragundi Rd., Jindalee, Qld., 4074, Australia

[21] Appl. No.: 287,746

[22] PCT Filed: Dec. 3, 1980

[86] PCT No.: PCT/AU80/00105

§ 371 Date: Jul. 29, 1981

§ 102(e) Date: Jul. 29, 1981

[87] PCT Pub. No.: WO81/01626

PCT Pub. Date: Jun. 11, 1981

[30] Foreign Application Priority Data

Dec. 3, 1979 [AU] Australia .............................. PE1569

[51] Int. Cl.⁴ .................................. F16K 31; F16K 08; F16K 31/02

[52] U.S. Cl. .................................. 251/65; 251/129.1; 251/337; 335/266

[58] Field of Search .......................... 251/65, 137, 337; 137/DIG. 7; 335/266, 267; 310/267, 29

[56] References Cited

U.S. PATENT DOCUMENTS

| | | | |
|---|---|---|---|
| 1,971,199 | 8/1934 | Owens | 200/98 |
| 2,935,663 | 5/1960 | Pollak | 335/256 |
| 2,967,545 | 1/1961 | Schmidt | 251/137 |
| 3,270,763 | 9/1966 | Kiefer | 251/65 |
| 3,275,964 | 9/1966 | Kumm | 251/137 |
| 3,434,390 | 3/1969 | Weiss | 251/137 |
| 3,444,490 | 5/1969 | Krummel et al. | 335/126 |
| 3,484,629 | 12/1969 | Kunz | 310/15 |
| 3,569,878 | 3/1971 | Grass et al. | 335/170 |
| 3,569,890 | 3/1971 | Baratelli | 337/170 |
| 3,629,746 | 12/1971 | Delucia | 335/170 |
| 4,056,255 | 11/1977 | Lace | 251/65 |
| 4,201,116 | 5/1980 | Martin | 335/266 |

FOREIGN PATENT DOCUMENTS

| | | |
|---|---|---|
| 154940 | 11/1950 | Australia . |
| 6728365 | 6/1967 | Australia . |
| 427851 | 6/1970 | Australia . |
| 504993 | 7/1975 | Australia . |
| 503085 | 12/1975 | Australia . |
| 883173 | 6/1952 | Fed. Rep. of Germany . |
| 1043703 | 11/1953 | France . |
| 1428611 | 5/1966 | France . |

*Primary Examiner*—Martin P. Schwadron
*Attorney, Agent, or Firm*—Foley & Lardner, Schwartz, Jeffery, Schwaab, Mack, Blumenthal & Evans

[57] ABSTRACT

The mechanism includes one member which may occupy one of two fixed positions and can be caused to change over from one position to the other at will. In order to accomplish rapid change over with minimum energy input and minimum impact, an elastic suspension of this member is provided and so arranged that the changeover process is substantially a half cycle of oscillation in which the moving member starts and ends with no or little speed of motion. The moving member is captured in the vicinity of, and held at the fixed positions, against the force exerted by the elastic suspension by mechanisms exerting short range forces upon it.

1 Claim, 5 Drawing Sheets

TWO POSITION MECHANISM

BACKGROUND OF THE INVENTION

1. Field of the Invention

This invention relates to mechanisms and specifically those mechanisms which have only two defined rest positions, but do not exercise rigid control over the motion of the member which is moved from one rest position to the other. For convenience, such mechanisms will hereafter be referred to as binary mechanisms.

2. Discussion of Related Art

Some examples of binary mechanisms are: electric relays, solenoid actuators, manually operated electric switches, and thermally actuated electric switches utilising differential expansion of metals. In each case, there has to be provided a means for applying a force or forces to the said moving member, hereafter referred to as the oscillator, and for removing this force or forces. This force or forces may be generated mechanically or electromagnetically, by the action of fluid pressure or vacuum, manually or inertially.

The great variety of modes of operation of binary mechanisms is also reflected in the great diversity of their application and for this reason, a functional rather than operational definition is found convenient.

It is a feature of binary mechanisms that, as the motion of the oscillator is not under rigid control, there is a degree of impact as the oscillator changes over from one rest position to the other. The combination of short change-over time and substantial oscillator mass leads to excessive impacts and an excessive requirement of energy for generating the said force or forces.

SUMMARY OF THE INVENTION

It is an object of this invention to minimize the severity of the said impacts and also to minimize the said energy requirement.

In the present invention, the oscillator is suspended from a spring or spring system so arranged that, during the early part of the change-over, spring forces act to accelerate the oscillator, while during the latter part of the change-over, they act to decelerate the oscillator. By this means, the greater part of the energy associated with the change-over is released and stored again in the spring or spring system, and only energy losses incurred during the change-over need to be supplied.

To hold the oscillator at either of the said fixed positions, against the pull of the spring or spring system, capture/release mechanisms are provided at each of the fixed positions, able to exert short range forces exceeding the spring forces; by means of which the oscillator, when approaching the fixed positions, is attracted to and held at the fixed positions. To release the oscillator from the fixed positions at any time, the short range force is temporarily suppressed, whereupon the spring force sets the oscillator into motion, causing it to execute a half cycle of oscillation which brings it into the vicinity of the opposite fixed position, where it is again captured and held until released in the aforesaid manner.

In various embodiments of this invention, the said spring or spring systems may comprise elastic solids or suitablcontained fluids. The said capture/release mechanisms may exert mechanical forces; forces due to pressure or vacuum; or forces due to magnetic fields. The best method of performing this invention known to me embodies springs of suitably formed elastic solids, and capture/release mechanisms exerting forces due to permanent magnets which are neutralised and amplified by means of suitable electric current carrying coils to effect release and capture respectively.

BRIEF DESCRIPTION OF THE DRAWINGS

The above and other objects of the present invention will become more readily apparent as the invention becomes more fully understood from the detailed description below, reference being made to the accompanying drawings in which like reference numerals represent like parts throughout and in which.

DETAILED DESCRIPTION OF THE PREFERRED EMBODIMENTS

Figure 1:
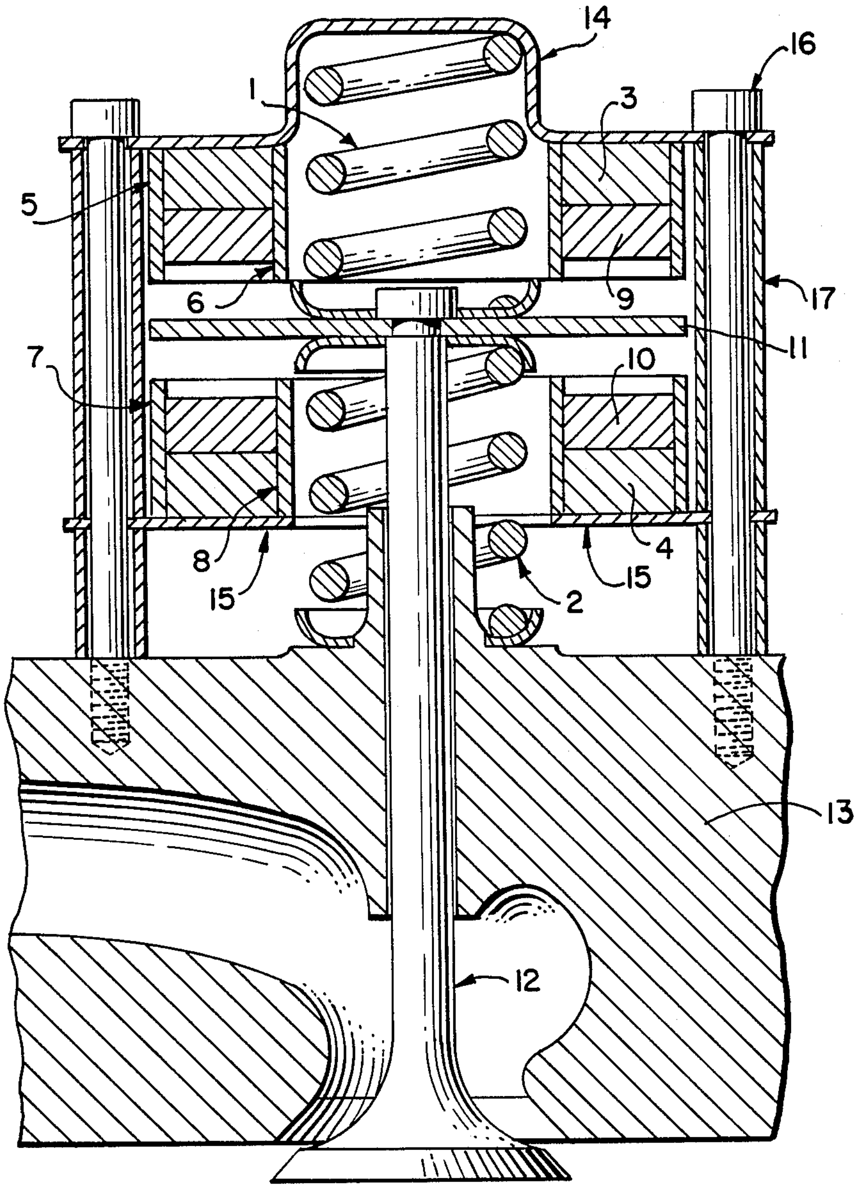
FIG. 1 is an elevational sectional view showing a first embodiment of a two position mechanism according to the present invention.

FIG. 1 illustrates a particular embodiment of the invention in which a binary mechanism is used to switch a poppet type valve between the full on and full off positions, which correspond to the rest positions of the oscillator which, in the present instance includes the valve. In FIG. 1, the valve is shown in the half-open positon at which the oscillator exhibits its greatest speed of motion.

With reference to FIG. 1, two helical coil springs, 1 and 2, contained between valve body 13, and upper mounting plate 14, act on the ferromagnetic capture disk 11, tending to hold it in the position shown, so that a force is required to displace capture disk 11 and with it valve 12 either up or down.

Also attached to mounting plate 14 is the upper capture release mechanism comprising permanent magnet ring 3 preferably of non-conductive composition, and magnetised radially; ferromagnetic pole pieces 5 and 6, and power coil 9.

In like fashion mounting plate 15 supports the lower capture/release mechanism comprisng permanent magnet ring 4; ferromagnetic pole pieces 7 and 8; and power coil 10; the mounting plates 14 and 15 being supported by a multiplicity of bolts 16 with tubular spacers 17 engaging with and held firmly upon the upper surface of valve body 13.

If, by means of an external agency, valve 12 is now pushed upwards, it will encounter an increasing spring force due to springs 1 and 2 as the capture disk 11 approaches pole pieces 5 and 6. However, in the vicinity of the pole pieces 5 and 6, the magnetic force will equal the spring force, and as it is acting in the opposite direction, balance it. Further upward displacement will cause capture disk 11 to snap onto the pole pieces 5 and 6 and be held there indefinitely.

By means of power coil 9, the effect of permanent magnet 3 may be amplified with electric current of suitable polarity, and by this means the said balance of forces may be achieved at a greater distance from pole pieces 5 and 6. Conversely, by reversing the polarity of the electric current in power coil 9, the effect of permanent magnet 3 may be partially or wholly cancelled, thereby effecting the release of capture disk 11 from the upper capture/release mechanism.

At the instance that capture disk 11 is released by the upper capture/release mechanism, the oscillator, comprising in this instance capture disk 11 and valve 12, proceeds to execute a half cycle of oscillation beginning from rest at the upper pole pieces 5 and 6 and ending again at rest in the vicinity of the lower pole pieces 7 and 8, except that the magnetic force due to pole pieces 7 and 8, imposes an additional displacement causing capture disk 11 to snap against the lower pole pieces 7 and 8 and remain there.

Power coils 9 and 10 may be connected in series or parallel, to form a single electric circuit, but in opposed sense, so that the effect of the one magnet is amplified when that of the other is diminished. When this is done, current effecting release from one capture/release mechanism needs only to be sustained until the oscillator is re-captured by the opposite capture/release mechanism to amplify the action of the capturing magnet force during re-capture.

The neutral position of the said oscillator is that where there is no net spring force and lies between the fixed positions. Where the oscillator encounters a greater resistance in one direction of motion than the other, the fixed positions ae unequally disposed about the neutral position. Now the said oscillator, after encountering the greater resistance, is captured at the fixed position closer to the neutral point, and after encountering the lesser resistance, the oscillator is captured at the fixed position further from the neutral point.

So far the capture/release mechanisms have been presented as the sole source of external energy to the oscillator. However, instances are envisaged, where it is desirable to supply a portion of the external energy by means other than the capture/release mechanisms, and at different points in the motion of the oscillator, to best compensate for the resistance to the motion of the oscillator in special cases.

The disadvantages of binary mechanisms in the present state of the art, to which this invention is directed, become most significant for oscillators of substantial mass and short change-over times.

It is envisaged that the present invention could be used to great advantage in high voltage, high power switching equipment; in internal combustion engines where total control of valve timing permits substantial improvement in part load efficiency, as well as increased maximum power; in gas and vapour expanders with variable inlet valve cut-off, for which the present invention is ideally suited; in mechanical indexing where random timing is necessary; as well as many of the applications for which solenoid type actuators are presently used.

Figure 2:
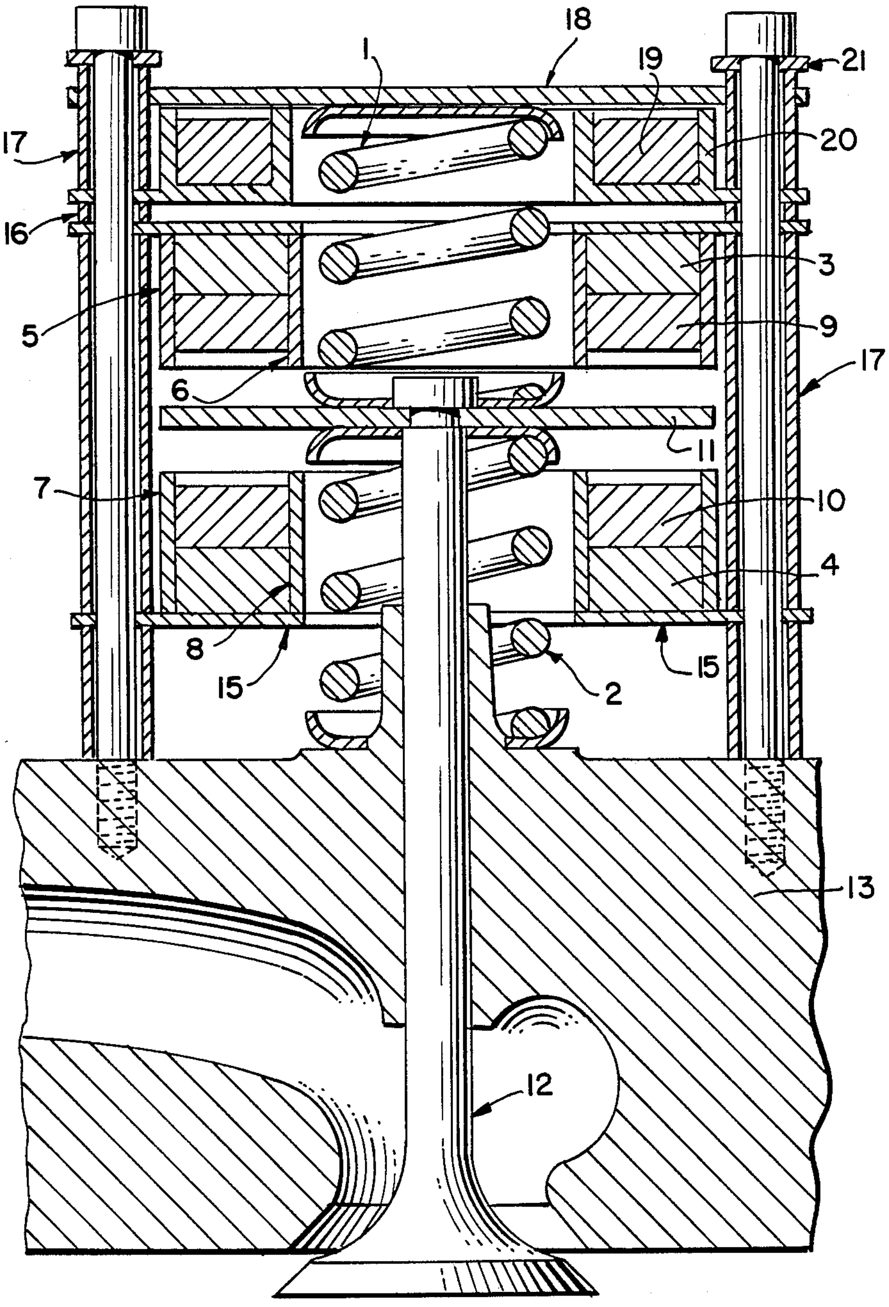
FIG. 2 is an elevational sectional view showing an embodiment of the present invention including a provision for imparting additional energy to the mechanism and an adjustment for the neutral position of the mechanism.

FIG. 2 shows a provision for imparting additional energy to the oscillator and for adjusting the neutral position of the oscillator (where the nett spring force is zero). Spacers 16 and 17 allow the neutral position of the oscillator to be determined. An electromagnetic actuator comprising ferromagnetic core 20, winding 10 and ferromagnetic armature 18 is provided for imparting additional energy to the oscillator. The winding 19 is normally not energized and the armature 18 therefore rests against the stop 21. If the oscillator is held by the upper capture/release mechanism, additional energy may be imparted by energizing coil 19 concurrently with or slightly before coil 9 is energized. This causes armature 18 to be pulled against core 20 thereby compressing spring 1 further. When the oscillator is subsequently released, this additional energy is imparted to it. After capture of the oscillator by the lower capture/-release mechanism, coil 19 is then de-energized. By suitable adjustment of the neutral position, the additional energy may be expended by the oscillator in either the downward or upward motion or both.

Figure 3:
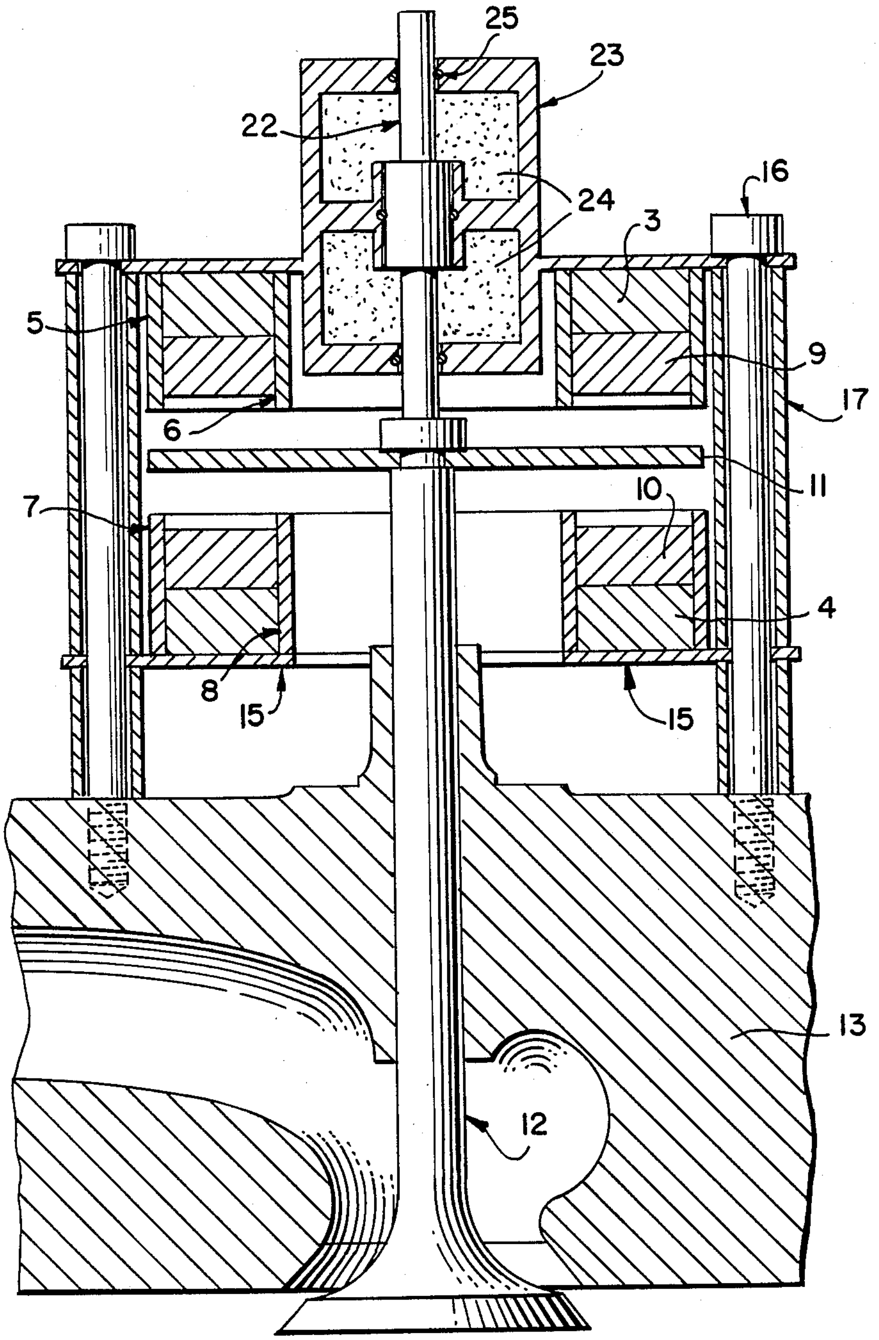
FIG. 3 is an elevational sectional view showing an embodiment of the invention including fluid springs.

FIG. 3 shows a configuration using fluid springs. Piston 22 is part of the oscillator and moves in the housing 23 containing two isolated chambers of compressible fluid 24. Seals 25 prevent leakage of compressed fluid.

Figure 4:
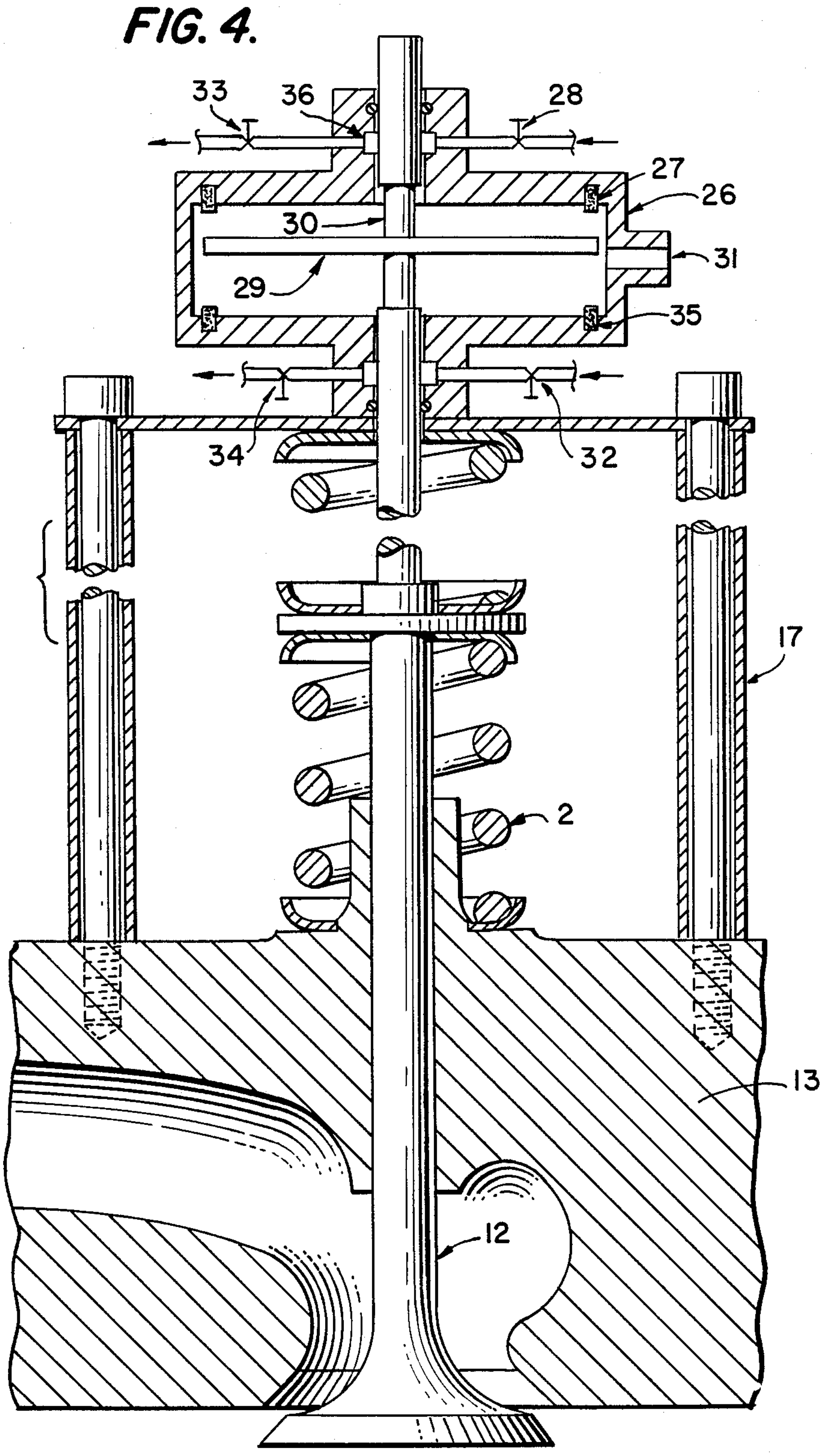
FIG. 4 is an elevational sectional view showing an embodiment of the invention using pressure actuated capture/release mechanisms.

FIG. 4 shows a configuration using pressure actuated capture/release mechanisms. It comprises a chamber 26 and disk 29 supported on waisted shaft 30. The chamber is pressurized through inlet 31 and vented to atmosphere (or connected to a vacuum) through valves 33 and 34 which are normally open. The disk has a clearance with the chamber wall but when it approaches compressible seal 27 or 35, a pressure differential develops holding the disk against the seal. To release the disk from, for example seal 27, valve 33 is closed and valve 28 is opened to the high pressure supply and pressure across the disk is equalized. As the disk moves away, the enlarged portion of shaft 30 seals off groove 35, preventing loss of fluid when valve 28 is closed and 33 is opened again.

Figure 5:
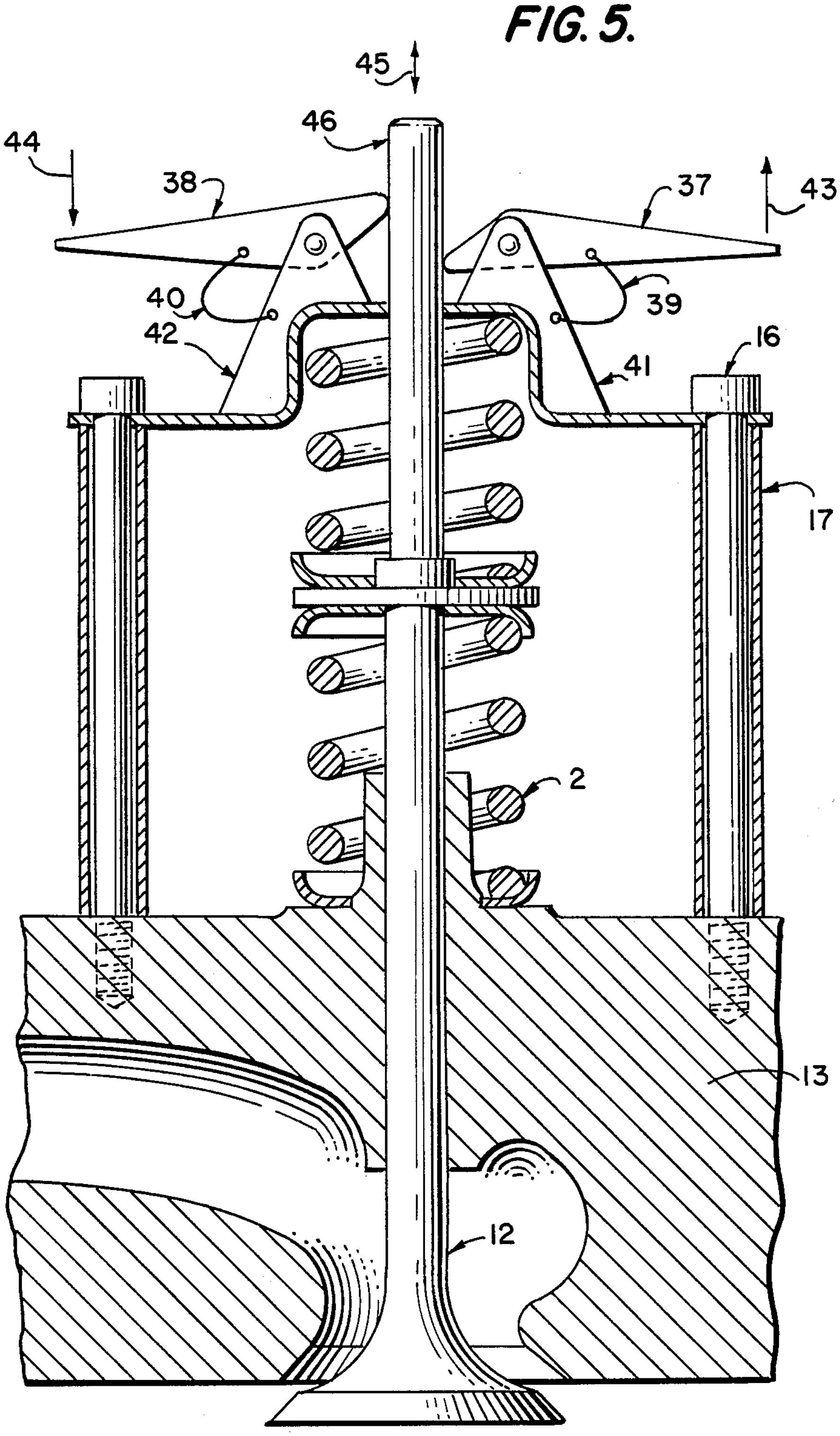
FIG. 5 is an elevational sectional view showing an arrangement of mechanical capture/release mechanisms.

FIG. 5 shows an arrangment of mechanical capture/-release mechanisms. Levers 37 and 38 are pivoted on brackets 41 and 42 while springs 39 and 40 keep the levers in contact with the oscillator stem 46. The oscillator is captured in the upper position by lever 38 as soon as it comes to rest and begins downward motion by frictional "jamming". To release the oscillator, an impulse 44 is imparted to the free end of lever 38, which lifts the lever out of contact with stem 46 until it is again captured by lever 37 in the lower position. At the same time that impulse 44 is applied to lever 38 another impulse 45 is applied to the oscillator stem to make up for energy losses during one cycle of operation. The oscillator is released from the lower position by impulse 43.

The claims defining the invention are claimed as follows:

1. A mechanism comprising:
   - a member which is movable between two fixed positions;
   - biasing means for applying oppositely directed biasing forces on said member to normally hold said member between said two positions such that said biasing means accelerates said member during a first portion of travel between said two positions and decelerates said member during a second portion of said travel, said biasing means comprising a spring system connected to said member and dimensioned such that, when said member is released from one of said fixed positions, said spring system accelerates said member during said first portion of travel and decelerates said member during said second portion causing said member to enter a location in the vicinity of the other fixed position, capture/release means for capturing said member in the vicinity of one of said two positons and releasing said member at will to permit said member to move toward the other of said two positions under the influence of said biasing means, said capture/-release means comprising: force applying means for applying a force to said member to overcome said biasing means and cause said member to move from said location in the vicinity of said other fixed position into said other fixed position whereby each time said member is released from one of said positions, said member travels under the influence of said biasing means and said force applying means through substantially a half cycle of operation to the other of said fixed positions and said biasing means aids in the movement of said member during a first portion of said half cycle and retards the movement of said member during a second portion of said half cycle in order to accomplish a rapid changeover with minimum impact, wherein said capture/release means comprises two capture/-release mechanisms positioned to capture said movable member in said two positions, respectively, wherein said movable member includes a ferromagnetic armature, and each of said capture/-release mechanisms comprises a permanent magnet, and an electrical coil positioned to affect the magnet field produced by said permanent magnet, wherein the coils of each of the two capture/-release mechanisms may be energized oppositely so that the effect of one of said permanent magnets is amplified while the effect of the other permanent magnet is neutralized.

* * * * *

UNITED STATES PATENT AND TRADEMARK OFFICE

CERTIFICATE OF CORRECTION

PATENT NO. : 4,749,167

DATED : Jun. 7, 1988

INVENTOR(S) : Martin Gottschall

It is certified that error appears in the above-identified patent and that said Letters Patent is hereby corrected as shown below:

Column 1, Line 65, in place of "suitablcontained" insert --suitably contained--;

Column 3, Line 10, in place of "instance" insert --instant--;

Column 3, Line 33, in place of "ae" insert --are--;

Column 3, Line 68, in place of "10" insert --19--;

Column 4, Line 33, in place of "35" insert --36--.

Signed and Sealed this

Fifteenth Day of August, 1989

*Attest:*

DONALD J. QUIGG

*Attesting Officer*

*Commissioner of Patents and Trademarks*